(12) United States Patent
Raju et al.

(10) Patent No.: US 9,918,067 B2
(45) Date of Patent: Mar. 13, 2018

(54) MODIFYING FUSION OFFSET OF CURRENT, NEXT, SECOND NEXT SEQUENTIAL FRAMES

(71) Applicant: TEXAS INSTRUMENTS INCORPORATED, Dallas, TX (US)

(72) Inventors: Veeramanikandan Raju, Karnataka (IN); Gregory R. Hewes, Cedar Park, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/226,430

(22) Filed: Aug. 2, 2016

(65) Prior Publication Data
US 2016/0344997 A1    Nov. 24, 2016

Related U.S. Application Data

(62) Division of application No. 13/669,017, filed on Nov. 5, 2012, now Pat. No. 9,432,654.

(51) Int. Cl.
*G06T 15/00*     (2011.01)
*H04N 13/00*     (2018.01)

(52) U.S. Cl.
CPC ..... *H04N 13/0025* (2013.01); *H04N 13/0022* (2013.01); *H04N 13/0033* (2013.01)

(58) Field of Classification Search
USPC .......................................... 345/419; 382/154
See application file for complete search history.

(56) References Cited

U.S. PATENT DOCUMENTS

| | | | |
|---|---|---|---|
| 5,740,337 A | 4/1998 | Okino et al. | |
| 8,224,067 B1 | 7/2012 | Sayre et al. | |
| 8,654,181 B2 | 2/2014 | Cornog et al. | |
| 9,098,930 B2 | 8/2015 | Cohen et al. | |
| 9,237,330 B2 * | 1/2016 | Wang | H04N 13/021 |
| 2007/0236560 A1 * | 10/2007 | Lipton | H04N 13/0003 348/43 |
| 2009/0262108 A1 | 10/2009 | Davidson | |

(Continued)

FOREIGN PATENT DOCUMENTS

WO     2012/037075 A1     3/2012

*Primary Examiner* — Kimbinh T Nguyen
(74) *Attorney, Agent, or Firm* — Lawrence J. Bassuk; Charles A. Brill; Frank D. Cimino

(57) ABSTRACT

The present invention is drawn to a device for use with first stereoscopic data, second stereoscopic data and a display device. The device includes an input portion, a convergence data detecting portion, a convergence plane portion, a comparing portion and a modification portion. The input portion can receive the first stereoscopic data and the second stereoscopic data. The convergence data detecting portion can detect first convergence data within the first stereoscopic data and can detect second convergence data within the second stereoscopic data. The convergence plane portion can determine a first convergence plane based on the first convergence data and can determine a second convergence plane based on the second convergence data. The comparing portion can compare the first convergence plane and the second convergence plane and can generate a convergence plane comparison. The modification portion can modify the first convergence data based on the convergence plane comparison.

9 Claims, 11 Drawing Sheets

(56) References Cited

U.S. PATENT DOCUMENTS

2011/0109731 A1  5/2011  Koo et al.
2011/0310982 A1  12/2011 Yang et al.
2012/0249746 A1  10/2012 Cornog et al.

* cited by examiner

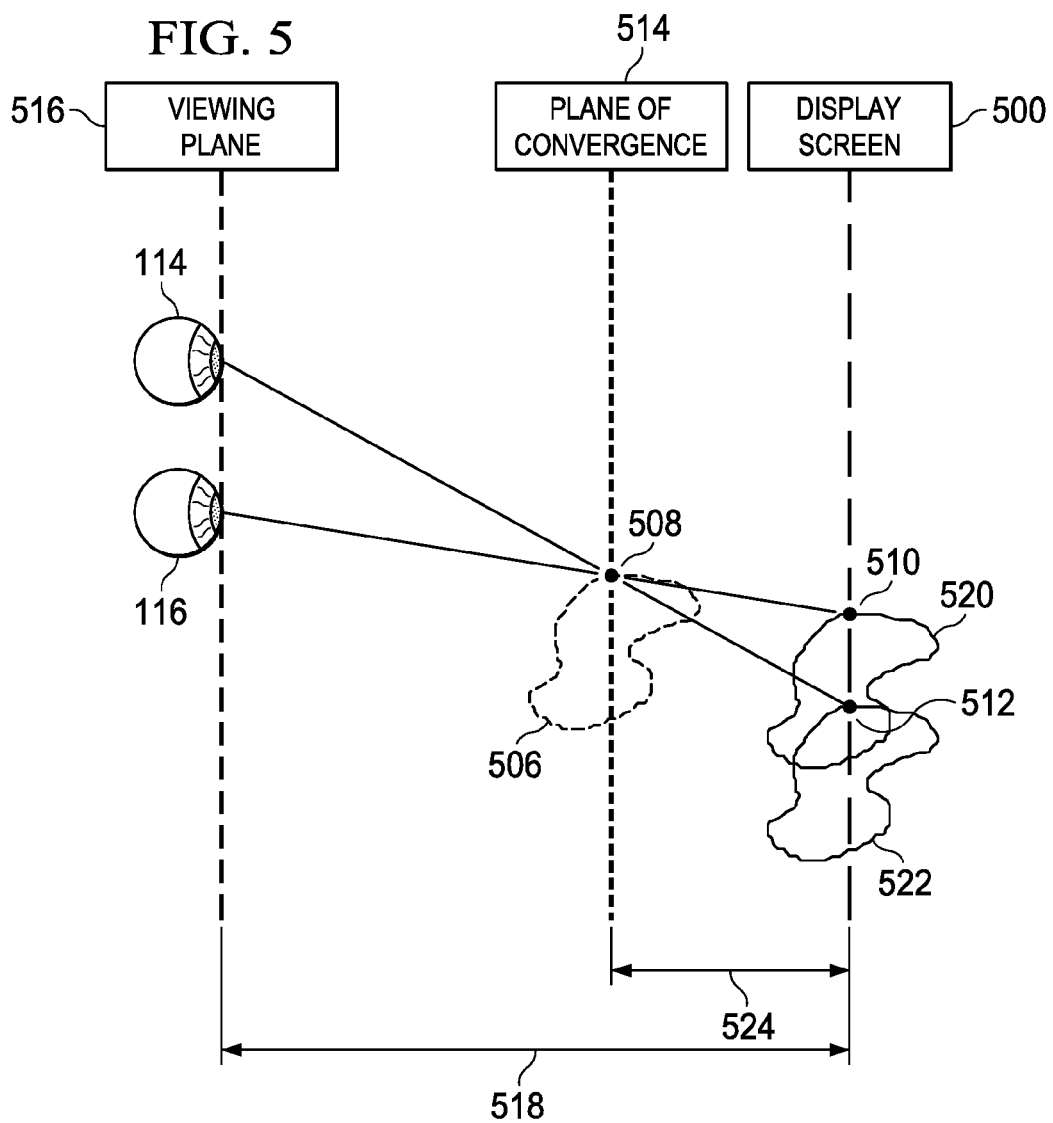

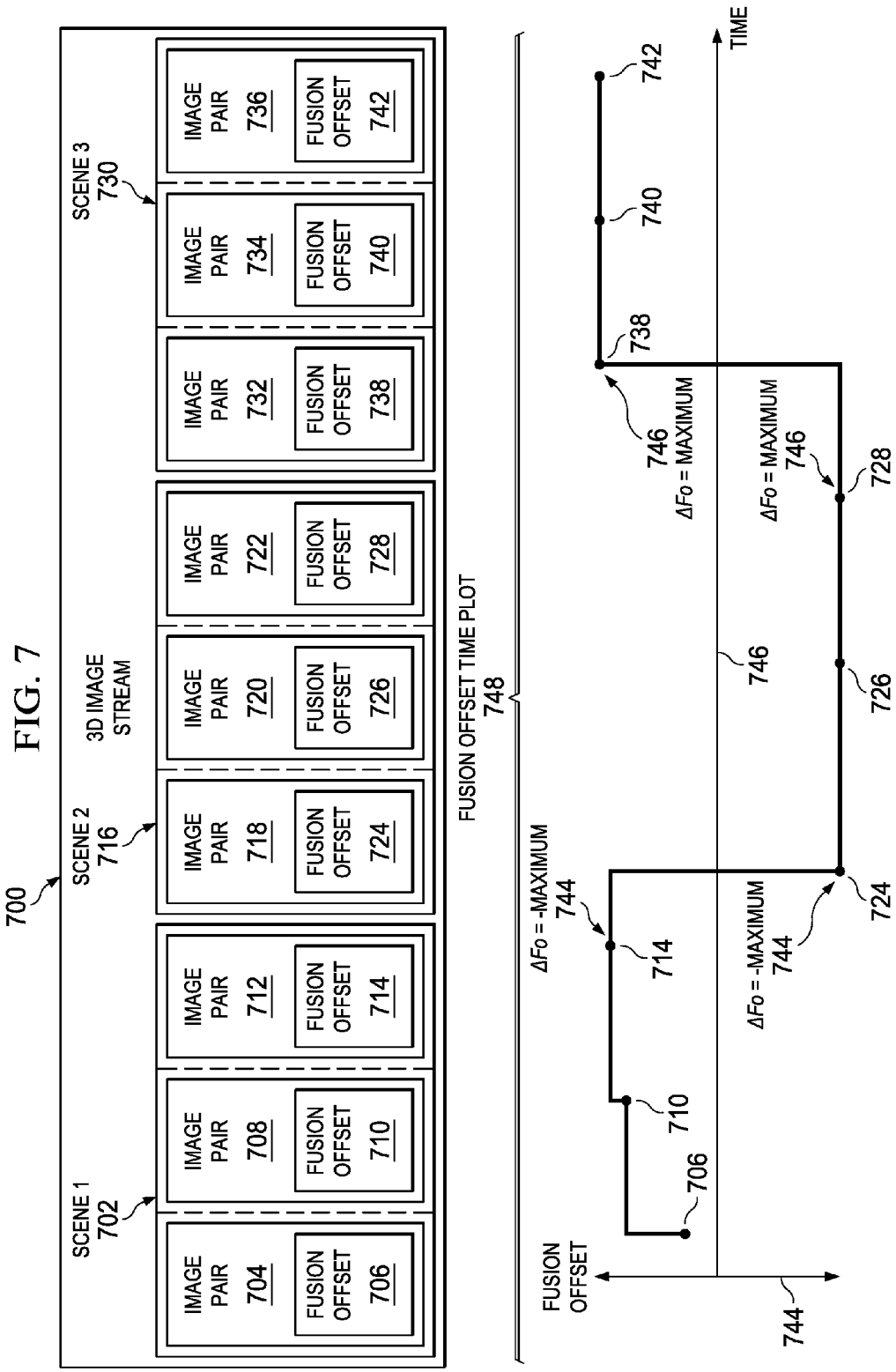

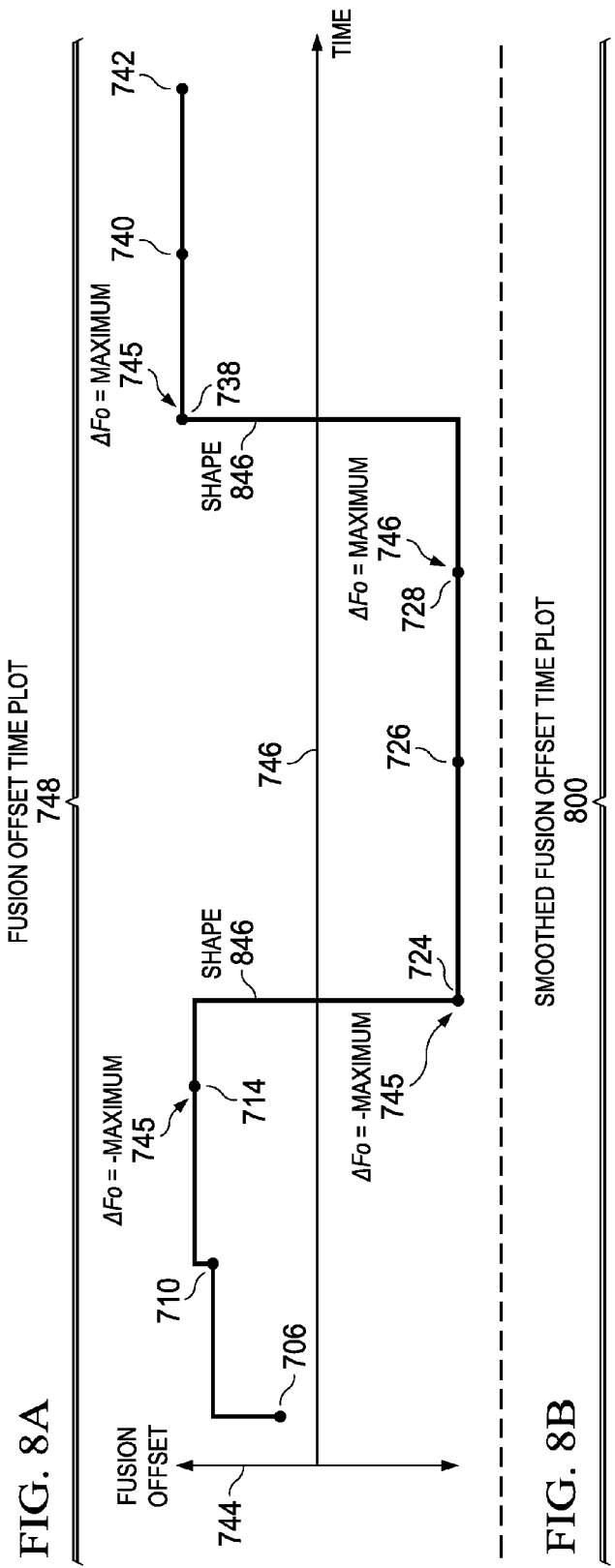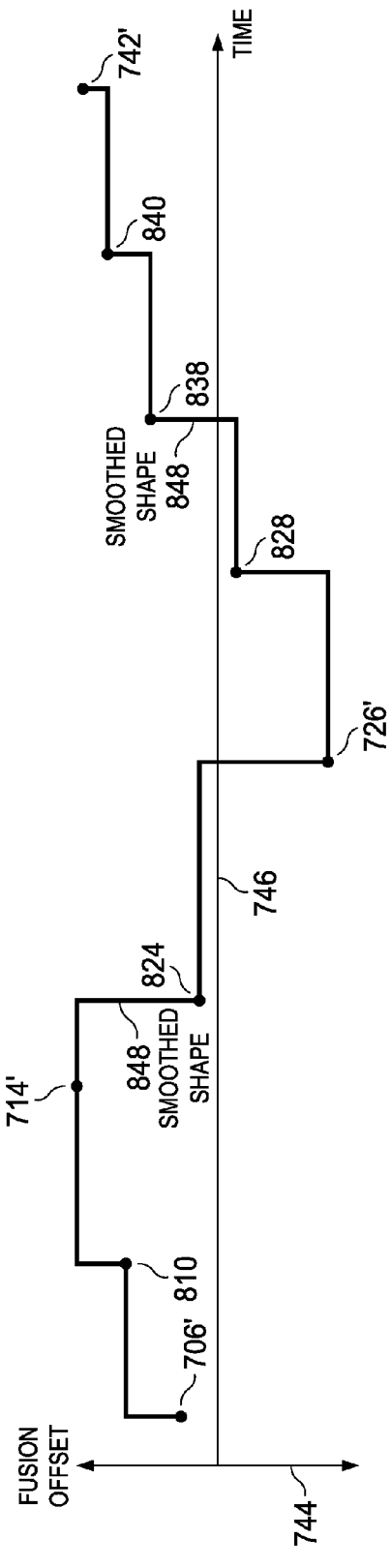

MODIFYING FUSION OFFSET OF CURRENT, NEXT, SECOND NEXT SEQUENTIAL FRAMES

This application is a Divisional of prior application Ser. No. 13/669,017, filed Nov. 5, 2012, now U.S. Pat. No. 9,432,654, issued Aug. 30, 2016.

BACKGROUND

The present invention relates to stereoscopic three-dimensional (hereinafter 3D) video.

A conventional 3D viewing system will now be described with additional reference to FIGS. 1-7.

FIG. 1 illustrates the processing of stereoscopic imagery by the brain.

As shown in the figure, a person 100 has a head 102. Head 102 includes a left eye 114, a right eye 116 separated by a horizontal displacement 120 and a brain 104. Brain 104 includes an image fuser 110.

Brain 104 is operable to store a left image 106 received from left eye 114 and a right image 108 received from right eye 116. Left image 106 represents an image of image 118 as viewed by left eye 114. Right image 108 represents an image of image 118 as viewed by right eye 116. Image fuser 110 is operable to combine left image 106 and right image 108 to create a 3D image 112.

In operation, person 100 uses left eye 114 to receive left image 106 and right eye 116 to receive right image 108. Left image 106 and right image 108 are received and processed to generate and store image 118 in brain 104. Left eye 114 is horizontal displacement 120 away from right eye 116. Because of horizontal displacement 120, left image 106 of image 118 captured by left eye 114 is horizontally different from right image 108 of image 118 captured by right eye 116. In brain 104, left image 106 is horizontally displaced from right image 108. In combination, left image 106 and right image 108 form a stereoscopic image pair. Image fuser 110 is operable to combine left image 106 and right image 108 into a composite, 3D image 112. Using left image 106 and right image 108, brain 104 is better operable to perceive imagery with depth and perspective.

The operation of a conventional camera assembly will now be described with additional reference to FIG. 2.

FIG. 2 illustrates the capture and storage of stereoscopic imagery by a conventional 3D camera assembly.

As shown in the figure, a conventional 3D camera assembly 200 includes a left camera 202, a right camera 204, a memory portion 208 and a memory portion 222.

Memory portion 208 is operable to store imagery captured by left camera 202. Memory portion 222 is operable to store imagery captured by right camera 204.

Left camera 202 is separated from right camera 204 by horizontal displacement 224.

Memory portion 208 includes a left image 206, a left image 208, a left image 210 and a left image 212, whereas memory portion 222 includes a right image 214, a right image 216, a right image 216 and a right image 220. Images 206, 208, 210 and 212 of memory portion 208 are arranged in a pair with an image 214, 216, 218 and 220, respectively, of memory portion 222 to form an image pair 223, an image pair 224, an image pair 226 and an image pair 228, respectively.

Conventional 3D camera assembly 200 is arranged to approximate brain 104's capacity to capture and store stereoscopic image pairs. Similar to left eye 114 and right eye 116 receiving and storing horizontally displaced imagery, left camera 202 and right camera 204 also receive and store horizontally displaced imagery because left camera 202 is arranged horizontal displacement 224 from right camera 204. Therefore, as left camera 202 and right camera 204 capture and store left images 212, 210, 208 and 206 and right images 220, 218, 216 and 214, respectively, of image 118, stereoscopic image pairs 228, 226, 224 and 222 are created due to horizontal displacement 224 between left camera 202 and right camera 204. In one example, stereoscopic image pair 228 includes left image 212 and right image 220. Left image 212 and right image 220 of stereoscopic image pair 228 are horizontally shifted from one another as a function of horizontal displacement 224 between left camera 202 and right camera 204.

The operation of a person receiving and processing stereoscopic data by way of a conventional 3D image controller will now be described with additional reference to FIG. 3.

FIG. 3 illustrates person 100 receiving stereoscopic image data from a conventional stereoscopic image source 300 by way of a conventional 3D image controller 302.

As shown in the figure, stereoscopic image source 300 has left and right image collections 208 and 222, respectively, each containing the respective left images 206, 208, 210 and 212 and right images 214, 216, 218 and 220 of image pairs 223, 224, 226 and 228. 3D image controller 302 includes a left image controller 304 and a right image controller 306.

3D image controller 302 is arranged to receive images from stereoscopic image source 300. In particular, left image controller 304 is arranged to receive left image collection 208 from stereoscopic image source 300 for selective transmission to left eye 114. Whereas, right image controller 306 is arranged to receive right image collection 222 from stereoscopic image source 300 for selective transmission to right eye 116.

Person 100 is able to receive images from 3D image controller 302. In particular, left eye 114 is arranged to sequentially receive images 212, 210, 208 and 206 of left image collection 208 from stereoscopic image source 300 as transmitted by left image controller 304. In addition, right eye 116 is arranged to sequentially receive images 220, 218, 216 and 214 of right image collection 222 from stereoscopic image source 300 as transmitted by right image controller 306.

Brain 104 is operable to receive and store left image 106 from left eye 114 and right image 108 from right eye 116. Image fuser 110 is operable to merge left image 106 and right image 108 into a composite, 3D image 112.

The stereoscopic image pairs 228, 226, 224 and 223 of stereoscopic image source 300 can be created using conventional 3D camera assembly according to the description of FIG. 2. 3D image controller 302 is used to sequentially transmit the left images of left image collection 208 to left eye 114 and to sequentially transmit the right images of right image collection 222 to right eye 116 thereby fixing left image 106 to correspond to left image collection 208 and fixing right image 108 to correspond to right image collection 222.

Brain 104 may experience discomfort when image fuser 110 operates on right image 108 and left image 106 is arranged using an un-natural horizontal displacement 224.

3D image controller 302 may include left image controller 304 and right image controller 306. In one example, left image controller 304 includes a projection device arranged to sequentially project the images of left image collection 208 using a blue light and includes a first portion of a set of eye glasses wherein the first portion is a blue lens arranged to be projectionally interposed between left eye 114 and left image collection 208. Continuing the example, right image controller 306 includes a projection device arranged to sequentially project the images of right image collection 222 using a red light and includes a second portion of a set of eyeglasses wherein the second portion is a red lens arranged to be projectionally interposed between right eye 116 and right image collection 222. In this example, the blue projected left images 206, 208, 210 and 212 are received by left eye 114 due to the filtering effect of left image controller 304 and the red projected right images 214, 216, 218 and 220 are received by the right eye 116 due to the filtering effect of right image controller 306.

The components of stereoscopic imagery will now be described and exemplified with additional references to FIGS. 4A and 4B.

FIGS. 4A-B illustrate a left image 400 and a right image 402, respectively.

As shown in FIG. 4A, left image 400 includes a pattern 406. As shown in FIG. 4B, right image 402 includes a pattern 408.

Parallax will now be described and exemplified with additional reference to FIG. 4C.

FIG. 4C illustrates a parallax 410 of left image 400 and right image 402 as an example of stereoscopic imagery.

As shown in the figure, a stereoscopic image 404 includes pattern 406 superimposed onto pattern 408. Parallax 410 is the horizontal offset between patterns 406 and 408.

FIG. 4C illustrates parallax 410, which is the horizontal displacement between two images of the same object taken from different horizontal positions. Horizontal displacement 120 between left eye 114 and right eye 116 and horizontal displacement 224 between left camera 202 and right camera 204 are operable to create parallax 410 between captured images such as pattern 406 and pattern 408. For example, left eye 114 may capture left image 400 having pattern 406 and right eye 116 may capture right image 402 having pattern 408 wherein pattern 406 and 408 are actually two different views of the same pattern horizontally offset by parallax 410 from one another. Image fuser 110 is operable to convert stereoscopic image 404 into a single 3D image 112.

Positive and negative parallax will now be described and exemplified with additional reference to FIGS. 5 and 6.

FIG. 5 illustrates an example of a negative parallax.

FIG. 5 includes left eye 114, right eye 116, an image 506, a right image 520, a left image 522, a viewing plane 516, a plane of convergence 514, a positive fusion offset 524, a focus distance 518, a display screen 500, a perceived image point 508, a right image point 510 and a left image point 512.

As shown in the figure, right image 520 and left image 522 are projected onto display screen 500. Left eye 114 and right eye 116 focus on display screen 500. Left eye 114 and right eye 116 are focus distance 518 away from viewing plane 516 and move to converge for receiving right image 520 and left image 522. Image 506 is therefore perceived to be in front of display screen 500. More specifically, image 506 is the perceived image created by image fuser 110 as described with reference to FIG. 1 appearing in front of display screen 500 on plane of convergence 514 at positive fusion offset 524 from display screen 500.

3D effects are perceptions created by image fuser 110 when operating on left and right imagery arranged in unnatural parallax. Unnatural parallax includes when a left image is to the right of a right image. As shown in FIG. 5, left image 522 is projected to the right of right image 520 on display screen 500 creating an unnatural parallax. 3D image controller 302 (not shown) is operable to insure that left eye 114 captures left image 522 and that right eye 116 captures right image 520.

Because left eye 114 is to the left of right eye 116, left eye 114 does not capture a left image such as left image 522 horizontally displaced to the right of a right image such as right image 520 in the natural world. Image fuser 110 is designed to fuse left images. The left images are horizontally displaced to the left with right images horizontally displaced to the right.

When left eye 114 captures left image 522 physically projected to the right of right image 520 on display screen 500 and right eye 116 captures right image 520 physically projected to the left of left image 522 on display screen 500, image fuser 110 creates image 506 having a negative parallax. Image 506 is a perception created by image fuser 110. Left image 522 and right image 520 are the physical images. Because of the unnatural relative positions of right image 520 and left image 522, image 506 is perceived by brain 104 to be in front of display screen 500 by positive fusion offset 524 on plane of convergence 514. Plane of convergence 514 and positive fusion offset 524 are examples of convergence data.

Generally speaking, a plane of convergence may be considered a plane where the left and right images are shifted toward one another so as to converge into a single image. With respect to FIG. 5, left image 522 viewed by left eye 114 and right image 520 viewed by right eye 116 verge so as to converge into a single image. As such, with respect to the discussion of FIG. 5 (and the following discussion of FIG. 6) a plane of convergence may be considered a plane of vergence.

FIG. 6 illustrates an example of positive parallax.

FIG. 6 includes left eye 114, right eye 116, an image 600, a right image 608, a left image 610, a viewing plane 516, a plane of convergence 606, a display screen 500, a perceived image point 604, a right image point 602 and a left image point 612.

As shown in the figure, right image 608 and left image 610 are projected onto display screen 500. Left eye 114 and right eye 116 focus on display screen 500 which is focus distance 518 away from viewing plane 516 and move to converge for receiving right image 608 and left image 610. Image 600 is the perceived image created by image fuser 110 (not shown) appearing behind display screen 500 on plane of convergence 606 at a negative fusion offset 620 from display screen 500. Plane of convergence 606 and negative fusion offset 620 are examples of convergence data.

As shown in FIG. 6, left image 610 is projected to the left of right image 608. This arrangement of horizontal displacement between images is known as positive parallax. When left eye 114 receives left image 610 and right eye 116 receives right image 608 arranged in positive parallax, image fuser 110 combines the images such that brain 104 perceives the combined image to be beyond the screen display 500 by a distance of negative fusion offset 620 as shown by perceived image point 604 in the figure.

FIG. 5 and FIG. 6 illustrate image manipulation not found in nature. In nature, images appear on a convergence plane positioned at focus distance 518. However, image pairs projected onto display screen 500 are perceived to be positive fusion offset 524 or negative fusion offset 620 away from display screen 500. Focus distance 518 is the distance between viewing plane 516 and display screen 500. In many cases, the physical location of projected image pairs of any parallax are focus distance 518 away from viewing plane 516 because the projected images are physically projected on the screen. However, because of positive or negative parallax, image fuser 110 perceives the image to be either closer or farther away than focus distance 518 on a plane of convergence different from display screen 500. In nature, the plane of convergence is focus distance 518 away from viewing plane 516. Viewing discomfort including tiredness, headache, eyestrain, dizziness, and the like can be caused when brain fuser 110 needs to process left image 106 and right image 108 to create 3D image 112 appearing on a convergence plane not positioned at focus distance 518 away from viewing plane 516. Moreover, viewing discomfort may be further worsened by large, abrupt, rapid, or frequent changes to the position of the plane of convergence.

A conventional 3D image stream and corresponding fusion offset time plot will now be described and exemplified with additional reference to FIG. 7.

FIG. 7 illustrates a multi-scene 3D image stream 700 and a corresponding plot of the fusion offset for each instance of stereoscopic data.

As shown in FIG. 7, 3D multi-scene 3D image stream 700 includes a scene 702, a scene 716 and a scene 730.

As shown in the figure, scene 702 contains a frame 704, a frame 708 and a frame 712 each having an image pair which together form an instance of stereoscopic data. The stereoscopic data of each frame 704, 708 and 712 includes a fusion offset 706, 710 and 714, respectively. Scene 716 and scene 730 are composed similarly to scene 702.

Also as shown in FIG. 7, a plot 748 has a y-axis 744 and an x-axis 746. Plot 748 includes points 706, 710, 714, 724, 726, 728, 738, 740 and 742.

In operation, multi-scene 3D image stream 700 is sequentially projected onto display screen 500. Typical of most movies, multi-scene 3D image stream 700 is composed of many scenes with a sampling noted as scene 702, scene 716 and scene 730 wherein each scene is composed of several frames, each frame being composed of an image pair having a parallax measured by fusion offset resulting in a perceived image position on a convergence plane. For example, frame 704 of scene 702 has a negative parallax measured by fusion offset 706 which means that the image created by image fuser 110 will be perceived to be on a convergence plane in front of display screen 500.

Also shown in FIG. 7, an abrupt change to the value of two sequential fusion offsets 714 and 724 may occur between the last frame of a first scene and the first frame of a second scene.

Likewise, an abrupt change to the value of fusion offset occurs between frame 722 of scene 716 and frame 732 of scene 730 as shown by plotted fusion offset values 728 and 738.

If care is not taken during the manufacture of a 3D movie, frequent abrupt changes to the convergence plane may occur between frames of different scenes resulting in viewing discomfort. Recall that 3D image capture may include 2 cameras positioned horizontally apart as shown in FIG. 2 for filming the same scene or image each from a slightly different perspective to approximate the slightly different images captured by each eye of a pair of human eyes.

In a first example, if left camera 202 and right camera 204 are not positioned correctly, the left and right images may be significantly more horizontally displaced than would be if captured by a pair of human eyes. In this case, the brain and the muscles that control the eyes may need to do additional work and may have to work faster in order to focus on and combine the two images into the single image noted as 3D image 112, which brain 104 perceives. The additional work can be the cause of stress, fatigue, pain, discomfort, and lack of enjoyment.

In a second example, left camera 202 and right camera 204 may not exceed normal boundaries of horizontal displacement 224. Even so, carelessness or lack of planning during postproduction may result in a 3D image stream as shown in FIG. 7 having frequent and abrupt changes to fusion offset.

More particularly, consider a movie, film, or video such as multi-scene 3D image stream 700 as shown in FIG. 7 composed of many scenes such as scene 702, scene 716 and scene 730 with each scene potentially captured independently from the others at different times, using different equipment, and created by different teams. Without meticulous and expensive record keeping on the part of the production staff, changes to fusion offset such as a max 745 or a max 746 are likely to occur between the last frame of a scene and the first frame of the subsequent scene.

Rapid, successive changes to fusion offset results also in rapid, successive changes to the plane of convergence as shown in FIG. 9 a plane of convergence 924 and a plane of convergence 928.

Recall in the natural world, plane of convergence 514 is focus distance 518 from viewing plane 516 meaning that the human eye perceives images at their physical distance meaning that right image 108 and left image 106 have zero parallax. When viewing stereoscopic imagery created with positive parallax as shown in FIG. 6 or negative parallax as shown in FIG. 5, left eye 114, right eye 116, and brain 104 operate differently than normal. The different operation may be one cause of 3D image stream view discomfort.

Stereoscopic imagery having a non-zero parallax requires brain 104 to perceive combined 3D image 112 at location, plane of convergence 514, 606 that is different from the actual physical location of right image 520, 608 and left image 610, 522, which is focus distance 518, away from viewing plane 516. When brain 104, left eye 114, and right eye 116 are forced to focus on an object at a location different from its perceived location, viewing discomfort may be created.

Moreover, 3D image viewing characterized by sequential stereoscopic image manipulation resulting in rapid and frequent changes of positive or negative parallax as shown in FIG. 5 and FIG. 6 causes left eye 114 and right eye 116 to continuously move at angles consistent with the plane of convergence whilst focusing at a distance corresponding to the actual physical locations of the sequential images at distances different from the planes of convergence.

Fatigue, eyestrain, and headaches are reported results of 3D image viewing. This discomfort can be attributed to the effects on the eyes and brain processing manufactured unnatural stereoscopic images having non-zero parallax.

Fatigue, eyestrain, and headaches are compounded as the brain processes a continuous stream of sequentially manufactured unnatural stereoscopic images characterized by rapid and abrupt parallax changes between image frames resulting in rapid and abrupt fusion offset and plane of convergence changes.

What is needed is a system and method that reduces the change in parallax, fusion offset, and convergence planes between successive stereoscopic image frames whilst preserving the novel and enjoyable experience of watching 3D imagery to reduce or eliminate fatigue, eyestrain, headaches, and other forms of discomfort.

BRIEF SUMMARY

The present invention provides a system and method that reduces the change in parallax, fusion offset, and convergence planes between successive stereoscopic image frames whilst preserving the novel and enjoyable experience of watching 3D imagery to reduce or eliminate fatigue, eyestrain, headaches, and other forms of discomfort.

In accordance with an aspect of the present invention, a device is provided for use with first stereoscopic data, second stereoscopic data and a display device. The display device can display a first stereoscopic image, based on the first stereoscopic data, at a first time and can display a second stereoscopic image, based on the second stereoscopic data, at a second time. The second time is subsequent to the first time. The first stereoscopic image data has first convergence data such that the first stereoscopic image will be displayed with a first convergence plane. The second stereoscopic image data has second convergence data such that the second stereoscopic image will be displayed with a second convergence plane. The second convergence plane is different from the first convergence plane. The device includes an input portion, a convergence data detecting portion, a convergence plane portion, a comparing portion and a modification portion. The input portion can receive the first stereoscopic data and the second stereoscopic data. The convergence data detecting portion can detect the first convergence data within the first stereoscopic data and can detect the second convergence data within the second stereoscopic data. The convergence plane portion can determine the first convergence plane based on the first convergence data and can determine the second convergence plane based on the second convergence data. The comparing portion can compare the first convergence plane and the second convergence plane and can generate a convergence plane comparison. The modification portion can modify the first convergence data based on the convergence plane comparison.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 5 illustrates an example of a negative parallax;

FIG. 7 illustrates a multi-scene 3D image stream and a corresponding plot of the fusion offset for each instance of stereoscopic data;

FIG. 8A illustrates the example fusion offset time plot of FIG. 7;

FIG. 8B illustrates a smoothed fusion offset time plot 800, in accordance with aspects of the present invention;

DETAILED DESCRIPTION

Figure 1:
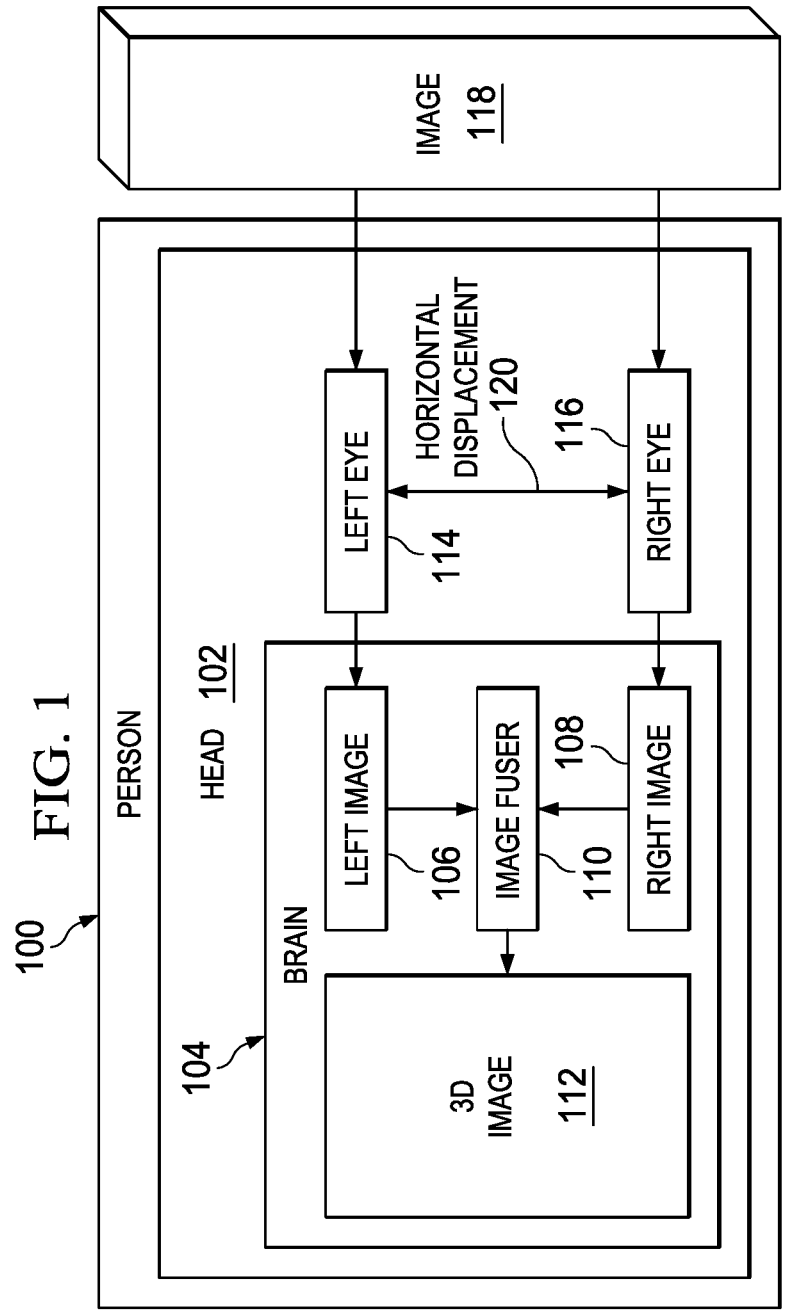
FIG. 1 illustrates the processing of stereoscopic imagery by the brain.
Figure 2:
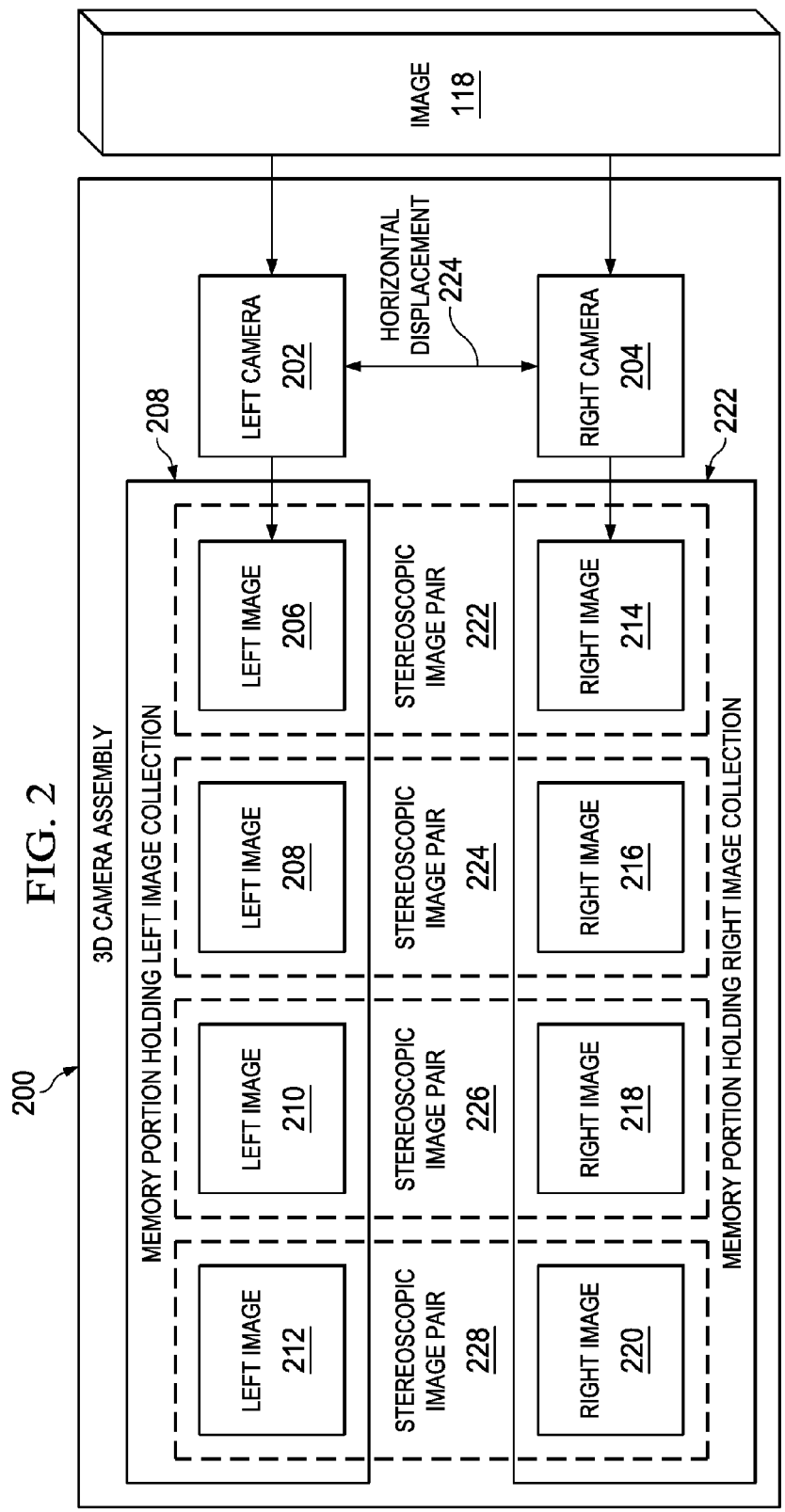
FIG. 2 illustrates the capture and storage of stereoscopic imagery by a conventional 3D camera assembly.
Figure 3:
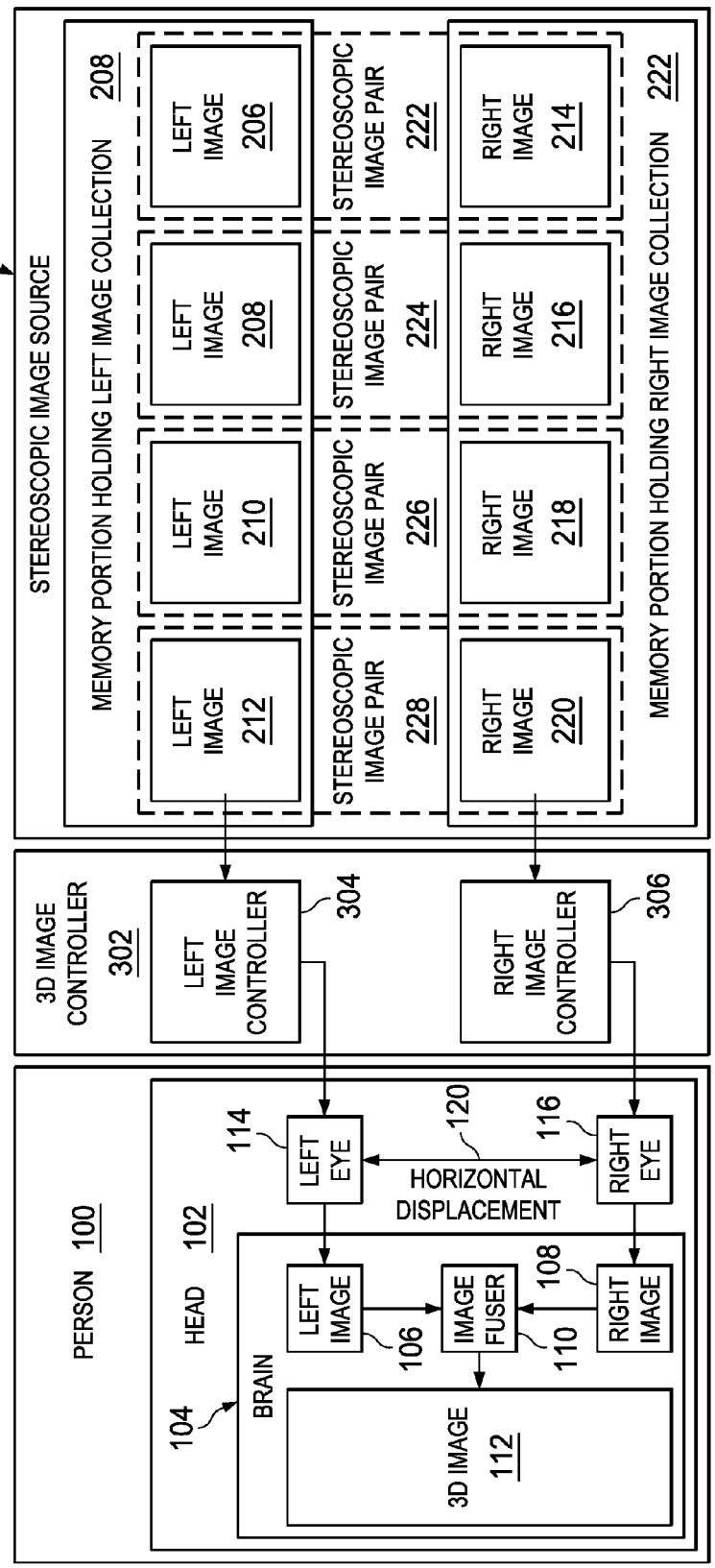
FIG. 3 illustrates person receiving a stereoscopic image data from a conventional stereoscopic data source by way of a conventional 3D image controller.

It is an object of the present invention to increase the viewing comfort of persons watching 3D movies by modifying 3D movie content to moderate the frequency, magnitude, and abruptness of changes in the successive planes of convergence by looking ahead from a frame of stereoscopic data to successive frames and selectively modifying the parallax between the image pairs of the frames.

More particularly a 3D image stream as shown in FIG. 7 includes of a series of image frames, each frame having a left and right image also referred to as an image pair. A portion of the frames within the 3D image stream may have image pairs that are horizontally displaced to create either positive or negative parallax so that the brain will fuse the left and right image into a composite which will be perceived to be in front of or behind the viewing screen at a location known as the plane of convergence.

Hence when viewing a 3D image stream, the viewer is subject to a series of image frames possibly each with a different plane of convergence. As detailed above frequent, rapid, and/or large changes to the plane of convergence may cause discomfort.

Viewer discomfort from excessive parallax includes large changes to the plane of convergence between image frames, frequent changes to the plane of convergence with a 3D image stream, as well as extreme values of planes of convergence.

By changing the parallax, also referred to as horizontal displacement, between one or more frame image pairs, the plane of convergence for an image frame can be changed. It is therefore possible to smooth a 3D image stream by reducing the amount of change to the plane of convergence between successive image frames resulting in a reduction or elimination of viewer discomfort.

Fusion offset time plot 748 and smoothed fusion offset time plot 800 include a plurality of points plotted on an X-Y axis. Connecting these points create a shape 846 and a smoothed shape 848. Shape 846 and smoothed shape 848 may be referred to as a curved shaped wherein the amount of curvature is a function the slope of the lines between two points plotted on the shape. A smoother curve is characterized by more moderate slopes wherein a steeper curve is characterized by more extreme slopes.

Smoothing, as shown in FIG. 8B, may include increasing or decreasing the change to the plane of convergence and the fusion offset between successive image frames by looking ahead from an image frame at future image frames and then manipulating the parallax between image pairs for a portion of the image frames to achieve a cumulatively smoother curve of plane of convergences and fusion offsets wherein the smoothing may reduce or eliminate forms of 3D image stream viewing discomfort without materially reducing viewing enjoyment.

Example embodiments in accordance with aspects of the present invention will now be described with additional reference to FIGS. 8A-10.

FIG. 8A illustrates the example plot of FIG. 7.

As shown in FIG. 8A, plot 748 has a y-axis 744 and an x-axis 746. Fusion offset time plot 748 includes points 706, 710, 714, 724, 726, 728, 738, 740 and 742.

FIG. 8B illustrates smoothed fusion offset time plot 800.

As shown in the figure, smoothed fusion offset time plot 800 has a y-axis 744 and an x-axis 746 including points 706, 810, 714, 824, 726, 828, 838, 840 and 742.

Smoothed fusion offset time plot 800 is derived from plot 748 and modified to moderate the abruptness of changes in fusion offset between frames. Recalling that fusion offset is determined by the horizontal displacement or parallax between left and right image pairs, it is conceivable that manipulation of left right image parallax can be used to modify the plane of convergence of any stereoscopic frame and therefore moderate changes to the fusion offset between any two successive frames for the purpose of improving view comfort.

Many modification strategies can be employed to moderate changes to the fusion offset between successive frames for the purpose of improving view comfort.

In FIG. 8A and FIG. 8B show corresponding fusion offset points aligned on x-axis 746.

A first, non-limiting example of a modification strategy for improving viewer comfort addresses the arrangement of points 706, 710 and 714 of plot 748. In this example, the difference between fusion offset 706 and fusion offset 710 is more than the difference between fusion offset 710 and fusion offset 714. As shown in FIG. 8B, fusion offset value 710 is changed to fusion offset value 810 so that the change in fusion offset is constant between the corresponding frames 704, 708 and 712. In this example, the modification strategy including looking ahead from frame 704 to frames 708 and 712 to determine the changes needed to smooth plot 748. This modification strategy includes equalizing the vertical distance between three points wherein the value of the slope of the line connecting the first and second points is different than the value of the slope of the line connecting the second and the third points.

A second, non-limiting example of a modification strategy for improving viewer comfort addresses the arrangement of points 714, 724 and 726 of plot 748. In this example, fusion offset 724 and fusion offset 726 are the same value. As shown in FIG. 8B, fusion offset value 724 is changed to fusion offset value 824 so that the change in fusion offset between 714 and 724 can be decreased by replacing fusion offset 724 with fusion offset 824. In this example, the modification strategy including looking ahead from frame 712 to frames 718 and 726 to determine the changes needed to smooth plot 748. This modification strategy includes equalizing the vertical distance between three points wherein the value of the slope of the line connecting any two of the points is zero.

A third, non-limiting example of a modification strategy for improving viewer comfort addresses the arrangement of fusion offset values 726, 728, 738, 740 and 742 of fusion offset time plot 748. In this example, points 726 and 728 are the same value as are points 740 and 742. Interposed between the two sets of like values is an abrupt change between fusion offset values 728 and 738. As shown in FIG. 8B, fusion offset values 728, 738 and 740 are changed to fusion offset values 828, 838 and 840, respectively, so that the change in fusion offset between 728 and 738 can be decreased or smoothed. In this example, the modification strategy includes looking ahead from frame 720 to frames 722, 732, 734 and 736 to determine the changes needed to smooth plot 748. This modification strategy includes equalizing the vertical distance between any set of contiguous points wherein the value of the slope of the line connecting any two of the points is zero.

Modification strategies can include any methods including any known smoothing or curve fitting methods, non-limiting examples of which include moving averages and least squares best fit methods.

Figure 9:
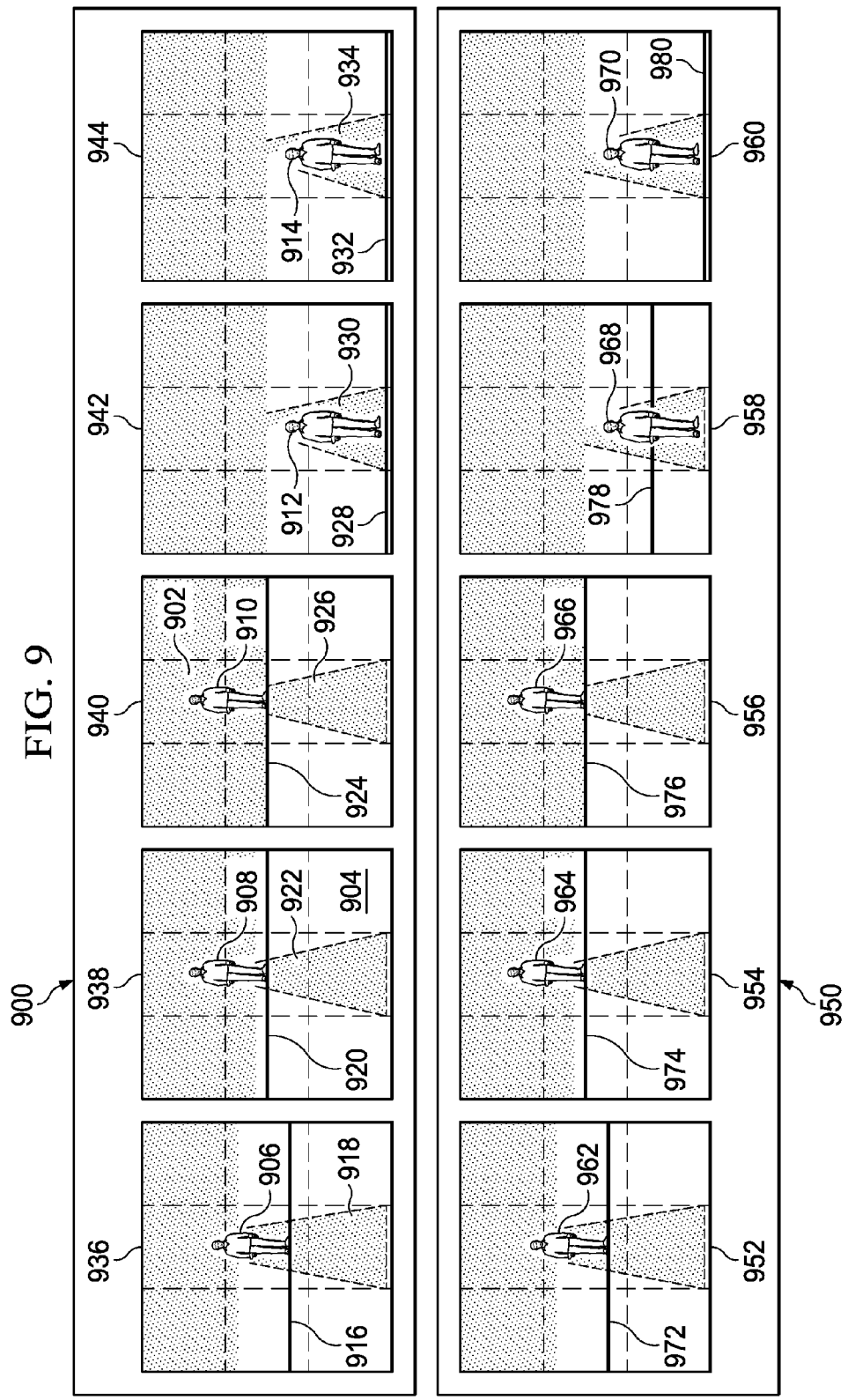
FIG. 9 illustrates an image sequence before and image sequence after the changes to the planes of convergence have been moderated, in accordance with aspects of the present invention.

FIG. 9 illustrates an image sequence 900 and an image sequence 950.

As shown in FIG. 9, image sequence 900 contains 5 stereoscopic image frames noted as a frame 936, a frame 938, a frame 940, a frame 942 and a frame 944. Each frame includes a horizon 902, a landscape 904, a path 918 and an object 906, an object 908, an object 910, an object 912 and an object 914 positioned near, a plane of convergence 916, a plane of convergence 920, a plane of convergence 924, a plane of convergence 928 and a plane of convergence 932.

Also shown in FIG. 9, smoothed image sequence 950 contains 5 stereoscopic image frames noted as a frame 952, a frame 954, a frame 956, a frame 958 and a frame 960. Each frame contains horizon 902, landscape 904, path 918 and an object 962, an object 964, an object 966, an object 968 and an object 970 positioned near a plane of convergence 972, a plane of convergence 974, a plane of convergence 976, a plane of convergence 978 and a plane of convergence 980.

As shown in FIG. 9, image sequences 900 and 950 provide a graphical visualization of stereoscopic frames enabling an association between numerical fusion offset values and visual objects resting at planes of convergence. Image sequence 900 corresponds to the portion of plot 748 including fusion offset values 706-726. Smoothed image sequence 950 corresponds to the portion of smoothed fusion offset time plot 800 defined by points 706'-726'. Modifications to fusion offset values as described in FIG. 8B, result in modification to the location of the planes of convergence shown in frames 952, 954, 956, 958 and 960 of smoothed image sequence 950.

Figure 10:
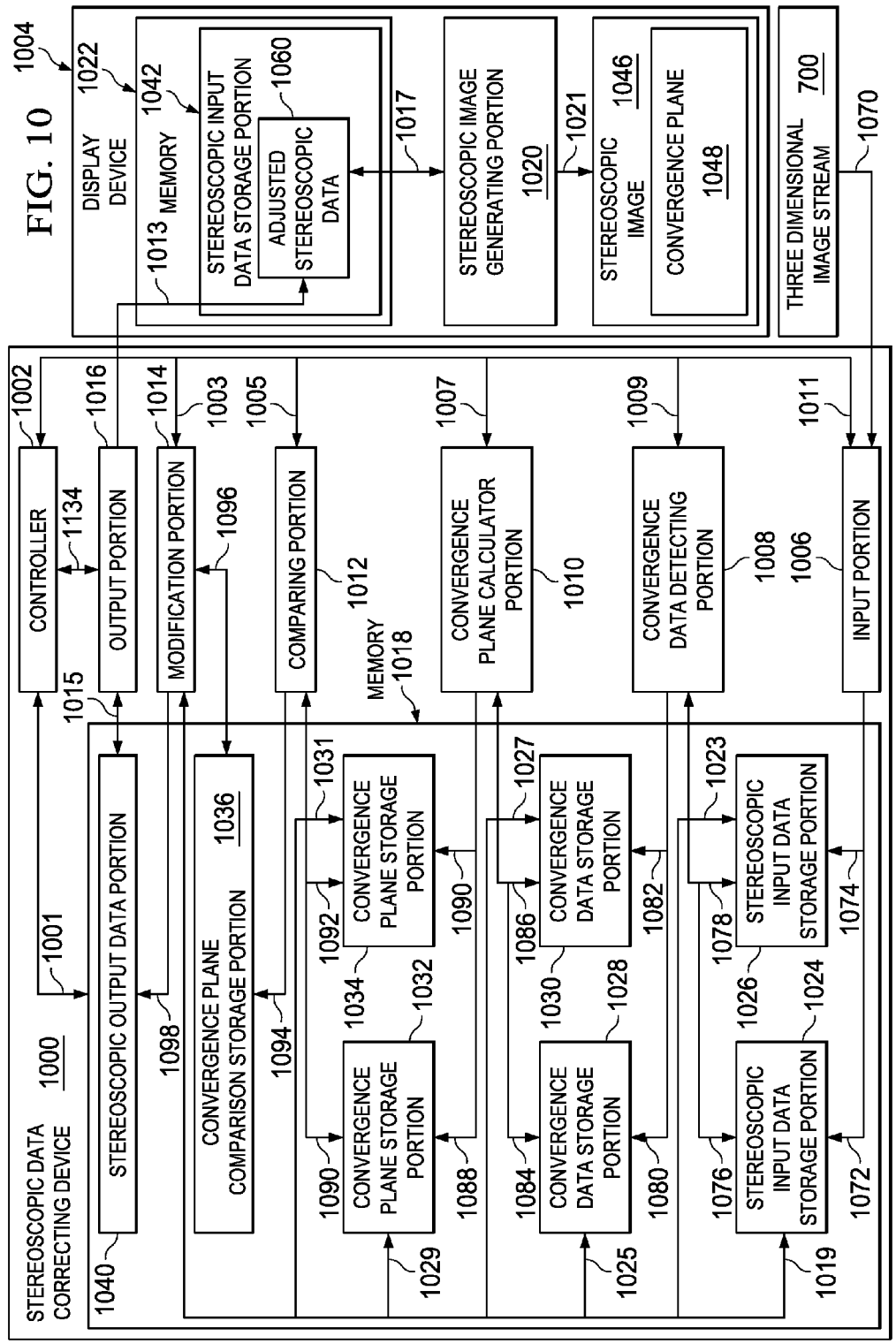
FIG. 10 illustrates a device operable to receive stereoscopic input data and generate adjusted stereoscopic output data for a display device, in accordance with aspects of the present invention.

FIG. 10 illustrates a stereoscopic data correcting device 1000 for use with stereoscopic input data, in accordance with aspects of the present invention.

As shown in the figure, a 3D video generating system includes stereoscopic data correcting device 1000 and a display device 1004. In this example, stereoscopic data correcting device 1000 and display device 1004 are distinct elements. However, stereoscopic data correcting device 1000 and display device 1004 may be combined as a unitary element. In other embodiments, at least one of stereoscopic data correcting device 1000 and display device 1004 may be implemented as a computer having stored therein tangible, non-transitory, computer-readable media for carrying or having computer-executable instructions or data structures stored thereon. Such tangible, non-transitory, computer-readable media can be any available media that can be accessed by a general purpose or special purpose computer. Non-limiting examples of tangible, non-transitory, computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible, non-transitory, computer-readable medium. Combinations of the above should also be included within the scope of tangible, non-transitory, computer-readable media.

Stereoscopic data correcting device 1000 includes a controller 1002, an input portion 1006, a convergence data detecting portion 1008, a convergence plane calculator portion 1010, a comparing portion 1012, a modification portion 1014, an output portion 1016 and a memory 1018. In this example, input portion 1006, convergence data detecting portion 1008, convergence plane calculator portion 1010, comparing portion 1012, modification portion 1014, output portion 1016 and memory 1018 are distinct elements. However, at least two of input portion 1006, convergence data detecting portion 1008, convergence plane calculator portion 1010, comparing portion 1012 and modification portion 1014, output portion 1016 and memory 1018 may be combined as a unitary element. In other embodiments, at least one of input portion 1006, convergence data detecting portion 1008, convergence plane calculator portion 1010, comparing portion 1012 and modification portion 1014, output portion 1016 and memory 1018 may be implemented as a computer having stored therein tangible, non-transitory, computer-readable media for carrying or having computer-executable instructions or data structures stored thereon.

Display device 1004 includes a stereoscopic image generating portion 1020 and a memory 1022. In this example, stereoscopic image generating portion 1020 and memory 1022 are distinct elements. However, stereoscopic image generating portion 1020 and memory 1022 may be combined as a unitary element. In other embodiments, at least one of stereoscopic image generating portion 1020 and memory 1022 may be implemented as a computer having stored therein tangible, non-transitory, computer-readable media for carrying or having computer-executable instructions or data structures stored thereon.

Memory 1018 includes a stereoscopic input data storage portion 1024, a stereoscopic input data storage portion 1026, a convergence data storage portion 1028, a convergence data storage portion 1030, a convergence plane storage portion 1032, a convergence plane storage portion 1034, a convergence plane comparison storage portion 1036, and a stereoscopic output data storage portion 1040. In this example, stereoscopic input data storage portion 1024, stereoscopic input data storage portion 1026, convergence data storage portion 1028, convergence data storage portion 1030, convergence plane storage portion 1032, convergence plane storage portion 1034, convergence plane comparison storage portion 1036, and stereoscopic output data storage portion 1040 are distinct elements. However, in some embodiments, at least two of stereoscopic input data storage portion 1024, stereoscopic input data storage portion 1026, convergence data storage portion 1028, convergence data storage portion 1030, convergence plane storage portion 1032, convergence plane storage portion 1034, convergence plane comparison storage portion 1036, and stereoscopic output data storage portion 1040 may be combined as a unitary element. In other embodiments, at least one of stereoscopic input data storage portion 1024, stereoscopic input data storage portion 1026, convergence data storage portion 1028, convergence data storage portion 1030, convergence plane storage portion 1032, convergence plane storage portion 1034, convergence plane comparison storage portion 1036, and stereoscopic output data storage portion 1040 may be implemented as a computer having stored therein tangible, non-transitory, computer-readable media for carrying or having computer-executable instructions or data structures stored thereon.

Memory 1022 includes a stereoscopic input data storage portion 1042. In this example, stereoscopic input data storage portion 1042 is a distinct element. In other embodiments, stereoscopic input data storage portion 1042 may be implemented as a computer having stored therein tangible, non-transitory, computer-readable media for carrying or having computer-executable instructions or data structures stored thereon.

Stereoscopic data correcting device 1000 is arranged to receive multi-scene 3D image stream 700 and generate an adjusted stereoscopic data 1060.

Display device 1004 is arranged to receive adjusted stereoscopic data 1060 and generate a stereoscopic image 1046.

Input portion 1006 is arranged to sequentially receive multi-scene 3D image stream 700 and sequentially output stereoscopic data to stereoscopic input data storage portions 1024 and 1026, respectively.

Convergence data detecting portion 1008 is arranged to receive stereoscopic input data from stereoscopic input data storage portions 1024 and 1026 by a data line 1076 and a data line 1078, respectively, and is operable to output convergence data to convergence data storage portions 1028 and 1030 by a data line 1080 and a data line 1082, respectively.

Convergence plane calculator portion 1010 is arranged to receive convergence data from convergence data storage portions 1028 and 1030 by a data line 1084 and a data line 1086, respectively, and generate convergence plane data for storage in convergence plane storage portions 1032 and 1034 using a data line 1088 and a data line 1090, respectively.

Comparing portion 1012 is arranged to receive convergence plane data from convergence plane storage portions 1032 and 1034 by data lines 1090 and 1092, respectively, and generate a convergence plane comparison value for storage in convergence plane comparison storage portion 1036 by a data line 1094.

As shown in the figure, modification portion 1014 is arranged to receive the convergence plane comparison value from convergence plane comparison storage portion 1036 by a data line 1096 to determine if modification is needed. Modification portion 1014 is operable to generate adjusted stereoscopic data 1060 for storage in stereoscopic output data storage portion 1040 by a data line 1098.

To generate adjusted stereoscopic data 1060, modification portion 1014 may use stereoscopic input data from stereoscopic input data storage portions 1024 and 1026 by a data line 1019 and a data line 1023, respectively; convergence data from convergence data storage portions 1028 and 1030 by a data line 1025 and a data line 1027, respectively; and convergence plan data from convergence plane storage portions 1032 and 1034 by a data line 1029 and a data line 1031, respectively.

Output portion 1016 is arranged to receive stereoscopic output data storage portion 1040 by a data line 1015 and provide adjusted stereoscopic data 1060 to display device 1004 by data line 1013.

Stereoscopic image generating portion 1020 is arranged to receive adjusted stereoscopic data 1060 from stereoscopic input data storage portion 1042 by a data line 1017 and generate stereoscopic image 1046 having a convergence plane 1048.

When controller 1002 invokes instruction line 1011, input portion 1006 receives multi-scene 3D image stream 700 by data line 1070 and sequentially stores image frames 704, 708, 712, 718, 720, 722, 732, 734 and 736 in stereoscopic input data storage portions 1024 and 1026 by data lines 1072 and 1074, respectively.

Figure 4A:
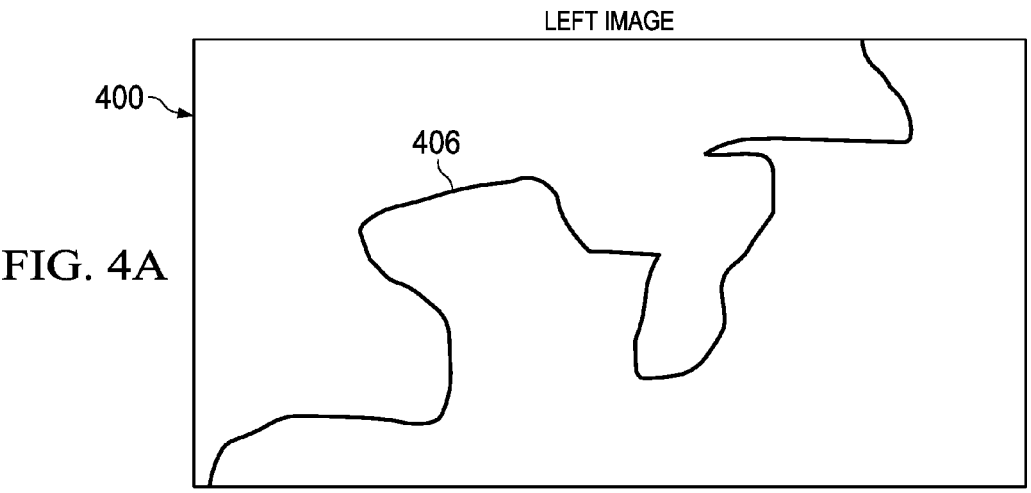
FIGS. 4A-B illustrate a left image and right image.
Figure 4B:
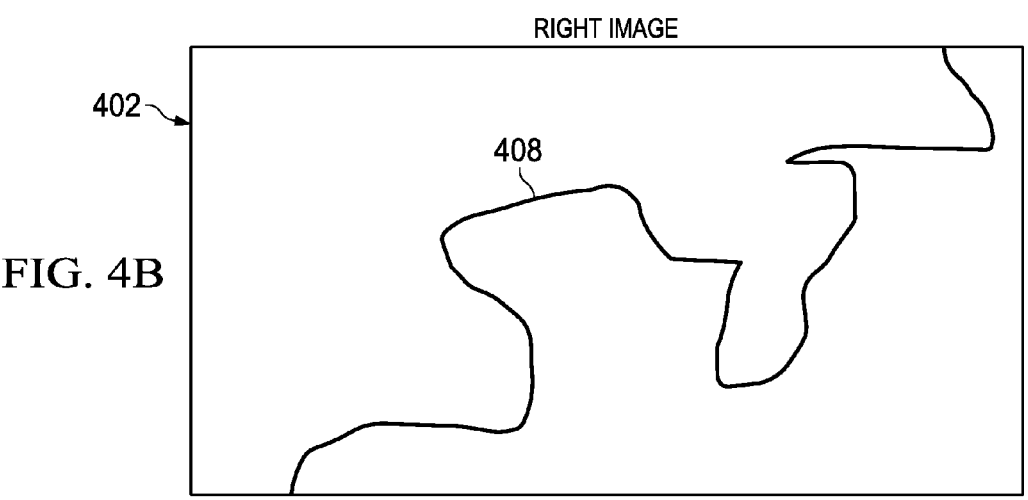
Figure 4C:
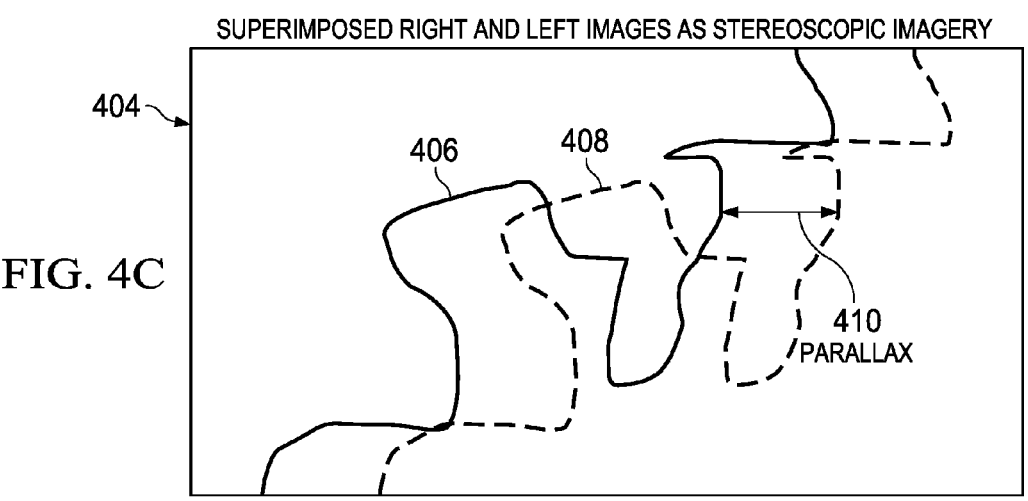
FIG. 4C illustrates a parallax of a left image and a right image as an example of stereoscopic imagery.
Figure 6:
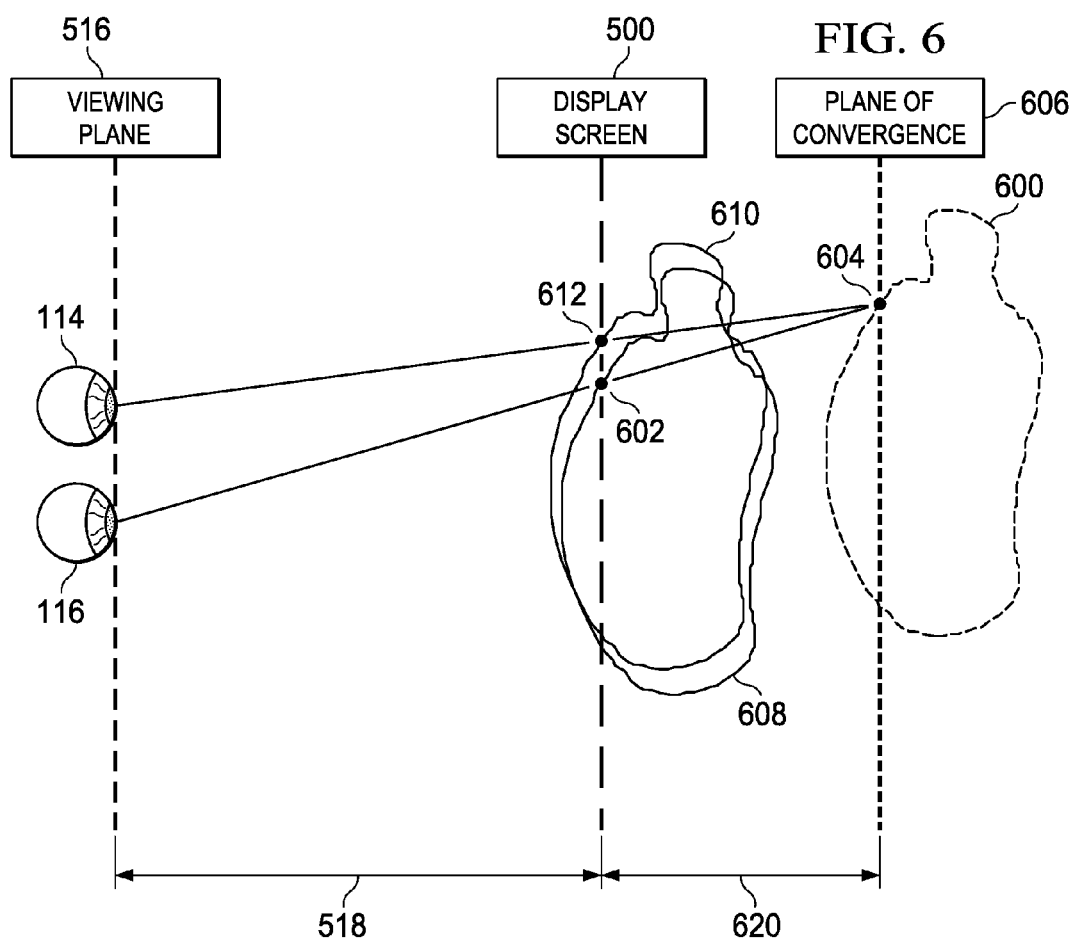
FIG. 6 illustrates an example of a positive parallax.

When controller 1002 invokes instruction line 1009, convergence data detecting portion 1008 receives stereoscopic input data from stereoscopic input data storage portions 1024 and 1026 by data lines 1076 and 1078, respectively, generates convergence data, and stores the convergence data in convergence data storage portions 1028 and 1030 by data lines 1080 and 1082, respectively. Convergence data detecting portion 1008 evaluates stereoscopic image pairs such as left image 400 of FIG. 4A and right image 402 of FIG. 4B to determine the parallax of the image pair such as parallax 410 of FIG. 4C When controller 1002 invokes instruction line 1007, convergence plane calculator portion 1010 receives convergence data from convergence data storage portions 1028 and 1030 by data lines 1084 and 1086, respectively, generates convergence plan data, and stores the convergence plane data in convergence plane storage portions 1032 and 1034 by data lines 1088 and 1090, respectively. Convergence plane calculator portion 1010 may evaluate left image point 512, right image point 510, right image 520, and left image 522 to generate additional convergence data such as plane of convergence 514 and positive fusion offset 524 as shown in FIG. 5

When controller 1002 invokes instruction line 1005, comparing portion 1012 receives convergence plane data from convergence plane storage portions 1032 and 1034 by data lines 1090 and 1092, respectively, generates convergence plane comparison data, and stores the data in convergence plane comparison storage portion 1036 by data line 1094. Comparing portion 1012 evaluates convergence plane data such as the plurality of fusion offset points 706-742 of fusion offset time plot 748 as shown in FIG. 7.

When controller 1002 invokes instruction line 1003, modification portion 1014 may receive the data in convergence plane comparison storage portion 1036 by data line 1096, convergence plane storage portions 1032 and 1034 by data lines 1029 and 1031, respectively, convergence data storage portions 1028 and 1030 by data lines 1025 and 1027, respectively, and stereoscopic input data storage portions 1024 and 1026 by data lines 1019 and 1023, respectively; applies a modification strategy; and stores adjusted stereoscopic data 1060 in stereoscopic output data storage portion 1040 by data line 1098. Modification portion 1014 generates adjusted stereoscopic data 1060 exemplified by smoothed fusion offset time plot 800 as shown in FIG. 8B.

When controller 1002 invokes instruction line 1033, output portion 1016 receives stereoscopic output data from stereoscopic output data storage portion 1040 by data line 1015 and provides adjusted stereoscopic data 1060 to display device 1004.

Stereoscopic image generating portion 1020 receives adjusted stereoscopic data 1060 from stereoscopic input data storage portion 1042 by data line 1017 and generates stereoscopic image 1046. Stereoscopic image 1046 is further exemplified by frames 952, 954, 956, 958 and 960 of FIG. 9 which are the images corresponding to smoothed fusion offset time plot 800 as shown in FIG. 8B.

In operation, stereoscopic data correcting device 1000 reads the stereoscopic data of multi-scene 3D image stream 700 and provides adjusted stereoscopic data 1060 to display device 1004 for the purpose of improving viewer comfort during the viewing experience by reducing excessive changes to the plane of convergence to adjacent image frames of multi-scene 3D image stream 700.

More particularly, input portion 1006 stores stereoscopic data of multi-scene 3D image stream 700, also shown as image frames 936, 938, 940, 942 and 944 of FIG. 9, in stereoscopic input data storage portions 1024 and 1026 for use by convergence data detecting portion 1008.

Convergence data detecting portion 1008 generates and stores convergence data in convergence data storage portion 1028 and 1030. Convergence plane calculator portion 1010, reads convergence data storage portions 1028 and 1030 to form convergence planes for storage in convergence plane storage portions 1032 and 1034.

Comparing portion 1012 retrieves the convergence planes from convergence plane storage portions 1032 and 1034 to form convergence plane comparison data for storage in convergence plane comparison storage portion 1036.

Modification portion 1014 uses the data stored in convergence plane comparison storage portion 1036 to determine if and how to modify the convergence data of convergence data storage portion 1028 and 1030. If modification portion 1014 determines modification is needed, modification portion 1014 selects a modification strategy to generate adjusted stereoscopic data 1060 for storage in stereoscopic output data storage portion 1040.

Output portion 1016 receives stereoscopic output data from stereoscopic output data storage portion 1040 by data line 1015 and provides adjusted stereoscopic data 1060 to display device 1004.

Image sequence 900 of FIG. 9 and smoothed image sequence 950 of FIG. 9 are examples of input and output (adjusted) stereoscopic image data respectively associated with stereoscopic data correcting device 1000 as described above.

Stereoscopic data correcting device 1000 stores portions of multi-scene 3D image stream 700 in stereoscopic input data storage portion 1024 and 1026. Display device 1004 receives adjusted stereoscopic data 1060 for storage in stereoscopic input data storage portion 1042 whereby stereoscopic image generating portion 1020 generates stereoscopic image 1046 having convergence plane 1048.

Therefore, stereoscopic data correcting device 1000 is able to improve viewing comfort of 3D movies by moderating the sequential changes to the planes of convergence by evaluating and modifying convergence data of stereoscopic images using various modification strategies able to look ahead from a given stereoscopic frame to subsequent stereoscopic frames to determine changes to convergence data for optimizing viewing comfort.

Figure 11:
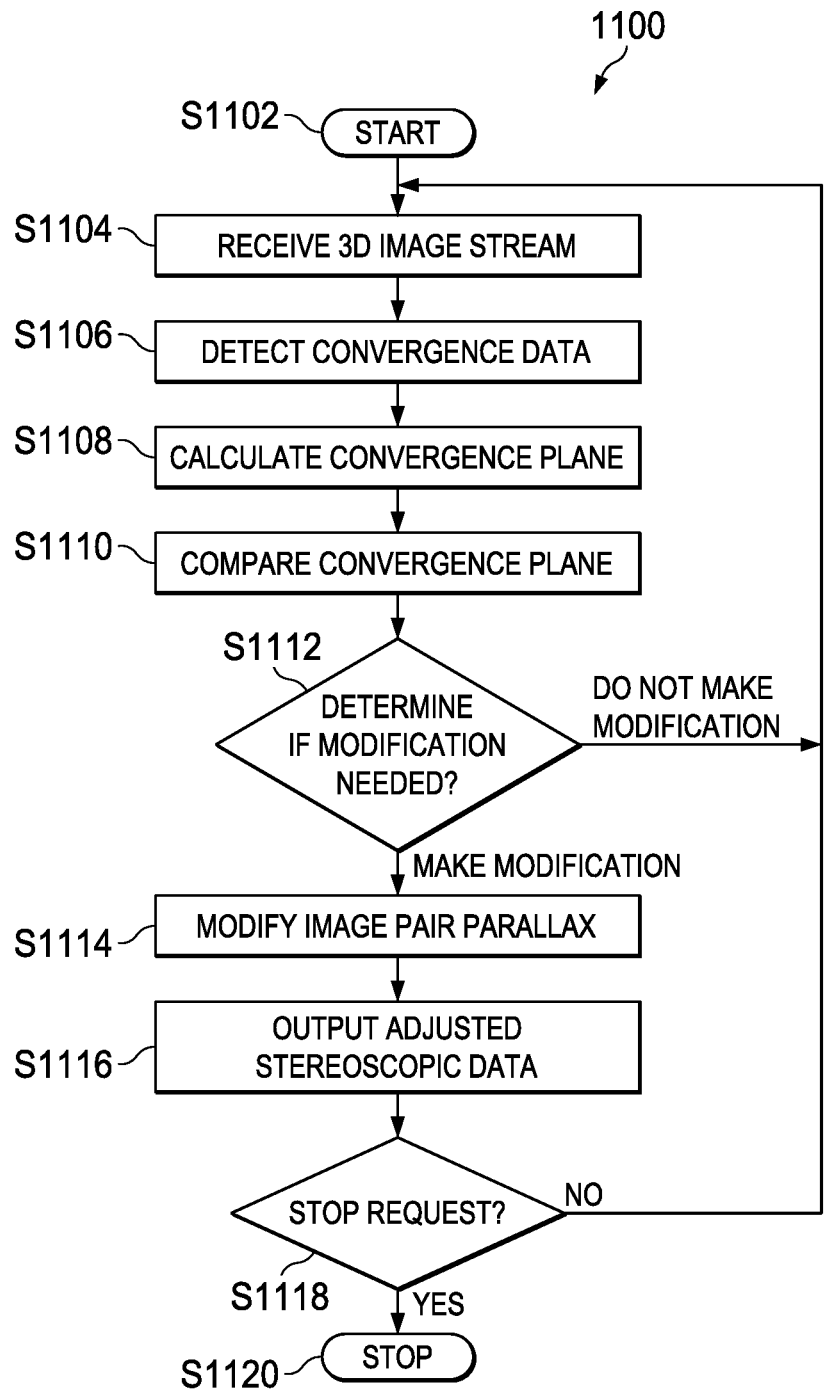
FIG. 11 illustrates an example method of operating a device operable to receive stereoscopic input data and generate adjusted stereoscopic output data for a display device, in accordance with an aspect of the present invention.

A more detailed example operation of stereoscopic data correcting device 1000 will now be describe with additional reference to FIG. 11.

FIG. 11 illustrates, an example method 1100 of operating of stereoscopic data correcting device 1000 in accordance with an aspect of the present invention.

As shown in FIG. 11, method 1100 starts (S1102), and data is received (S1104). For example, as shown in FIG. 10, input portion 1006 receives 3D image stream 700 for storage in stereoscopic input storage portions 1024 or 1026.

Returning to FIG. 11, convergence data is then detected (S1106). For example, as shown in FIG. 10, convergence data detecting portion 1008 receives stereoscopic data from stereoscopic input data storage portions 1024 or 1026 and convergence data is stored in convergence data storage portion 1028 or 1030.

Returning to FIG. 11, a convergence plane is then calculated (S1108). For example, as shown in FIG. 10, convergence plane calculator portion 1010 receives convergence data from convergence data storage portion 1028 or 1030 and a convergence plane value is stored in convergence plan storage portion 1032 or 1034.

Returning to FIG. 11, at least two convergence planes are then compared (S1110). For example, as shown in FIG. 10, comparing portion 1012 receives the at least two convergence planes from convergence plane storage portions 1032 and 1034 and stores the resultant comparison data in convergence plane comparison storage portion 1036.

Returning to FIG. 11, a modification decision is then determined (S1112). For example, as shown in FIG. 10, modification portion 1014 receives the convergence plane comparison data from convergence plane comparison storage portion 1036 to determine if the received stereoscopic data should be modified according to an aspect of the invention.

If modification is not needed (No at S1112), additional images are received (S1104).

If modification is needed (Yes at S1112), modification is performed (S1114). For example, as shown in FIG. 10, modification portion 1014 applies an appropriate modification strategy to adjust the parallax between the images of at least one image pair and stores the adjusted stereoscopic data in stereoscopic output data portion 1040 (S1116).

Returning to FIG. 11, a stop request decision (S1118) is then determined wherein operation is either returned to (S1104) and operation continues as previously described or operation is halted (S1120).

A problem with the conventional system is that the plane of convergence for each image frame is established during image capture, more particularly during filming and may not be easily changed or quantified. The conventional system, having no capacity to automatically manage the magnitude, abruptness or frequency of the changes to the plane of convergence for each image frame is subject to producing 3D image streams containing a plurality of image frames whose plane of convergence is excessively different from that of subsequent image frames resulting in view discomfort including eye strain, headache, and the like. Moreover, mitigation of the problem may include manually determining a fusion offset plot for the 3D image stream, analyzing the plot to determine the needed modifications, and re-filming a portion of the 3D image stream to create the modifications. The mitigation is expensive and time consuming.

In accordance with aspects of the present invention, a device is operable to receive a 3D image stream including a plurality of image frames, look ahead from one of the image frames to subsequent image frames and adjust the parallax of a portion of the subsequent image frames such that the adjusted values of the plane of convergence for the subsequent frames would represent a smoother curve if plotted sequentially over time than that of the pre-adjusted values. In other words, look ahead is a sort of lag in the display, wherein several future frames may be decoded and analyzed ahead of the current frame. Further, the device is operable to output a new 3D image stream including the image frames with the adjusted parallax values which minimize the frequency, abruptness, and magnitude of changes of the plane of convergence between an image frame and subsequent image frames thereby improving view comfort. Further the device, being able to automatically and quickly generate the new 3D image stream having a cumulatively smoother fusion offset time plot, provides a cost effective solution for improving viewer discomfort due to excessive parallax and parallax changes.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A stereoscopic correcting device comprising:
   (a) an input portion receiving stereoscopic data in the form of a series of stereoscopic image frames with each frame including a left image and a right image and with each frame including convergence data that includes plane of convergence data and fusion offset data, the fusion offset data representing the distance between a plane of convergence and a display screen;
   (b) a memory coupled to the input portion and storing the stereoscopic data;
   (c) a comparing portion coupled to the memory and comparing the fusion offset data for a current frame, a first next sequential frame, and at least a second next sequential frame;
   (d) a modification portion coupled to the memory and modifying the fusion offset data of the first next sequential frame so that a change in fusion offset data is constant between the current frame, the first next sequential frame, and the second next sequential frame; and
   (e) an output portion coupled to the memory and outputting sequential stereoscopic image frames with modified fusion offset data.

2. The device of claim 1 including a display screen coupled to the output portion.

3. The device of claim 1 including a controller having instruction lines coupled to the memory portion, the input portion, the comparing portion, the modification portion, and the output portion.

4. A stereoscopic correcting device comprising:
   (a) an input portion receiving stereoscopic data in the form of a series of stereoscopic image frames with each frame including a left image and a right image and with each frame including convergence data that includes plane of convergence data and fusion offset data, the fusion offset data representing the distance between a plane of convergence and a display screen;
   (b) a memory coupled to the input portion and storing the stereoscopic data;
   (c) a comparing portion coupled to the memory and comparing the fusion offset data for a current frame, a first next sequential frame, and at least a second next sequential frame;
   (d) a modification portion coupled to the memory and modifying the fusion offset data of the first next sequential frame by equalizing a change in fusion offset data between the current frame and the first next sequential frame and between the first next sequential frame and the second next sequential frame; and (e) an output portion coupled to the memory and outputting sequential stereoscopic image frames with modified fusion offset data.

5. The device of claim 4 including a display screen coupled to the output portion.

6. The device of claim 4 including a controller having instruction lines coupled to the memory portion, the input portion, the comparing portion, the modification portion, and the output portion.

7. A stereoscopic correcting device comprising:

(a) an input portion receiving stereoscopic data in the form of a series of stereoscopic image frames with each frame including a left image and a right image and with each frame including convergence data that includes plane of convergence data and fusion offset data, the fusion offset data representing the distance between a plane of convergence and a display screen;

(b) a memory coupled to the input portion and storing the stereoscopic data;

(c) a comparing portion coupled to the memory and comparing the fusion offset data for a current frame, intermediate sequential frames next after the current frame, and a last sequential frame next after the intermediate sequential frames;

(d) a modification portion coupled to the memory and modifying the fusion offset data of the intermediate sequential frames so that a change in fusion offset data is decreased between the current frame, the intermediate sequential frames, and the last sequential frame; and (e) an output portion coupled to the memory and outputting sequential stereoscopic image frames with modified fusion offset data.

8. The device of claim 7 including a display screen coupled to the output portion.

9. The device of claim 7 including a controller having instruction lines coupled to the memory portion, the input portion, the comparing portion, the modification portion, and the output portion.

* * * * *